(12) United States Patent
Bär et al.

(10) Patent No.: US 10,500,795 B2
(45) Date of Patent: Dec. 10, 2019

(54) METHOD OF CONNECTING AT LEAST TWO STRUCTURAL PARTS

(71) Applicant: AUDI AG, Ingolstadt (DE)

(72) Inventors: Carsten Bär, Ingolstadt (DE); Peter Wurster, Nürnberg (DE)

(73) Assignee: AUDI AG, Ingolstadt (DE)

( * ) Notice: Subject to any disclaimer, the term of this patent is extended or adjusted under 35 U.S.C. 154(b) by 0 days.

(21) Appl. No.: 15/468,483

(22) Filed: Mar. 24, 2017

(65) Prior Publication Data

US 2017/0274581 A1 Sep. 28, 2017

(30) Foreign Application Priority Data

Mar. 26, 2016 (DE) ........................ 10 2016 003 810

(51) Int. Cl.
*B29C 65/00* (2006.01)
*B62D 27/02* (2006.01)
(Continued)

(52) U.S. Cl.
CPC ............ *B29C 66/742* (2013.01); *B62D 27/00* (2013.01); *B62D 27/026* (2013.01); *F16B 11/00* (2013.01);
(Continued)

(58) Field of Classification Search
CPC ...... B62D 27/00; B62D 27/02; B62D 27/023; B62D 27/026; B62D 27/04; F16B 11/00;
(Continued)

(56) References Cited

U.S. PATENT DOCUMENTS 2,136,122 A * 11/1938 Einar Almdale ...... B62D 21/00
280/797
5,383,592 A 1/1995 Fussnegger
(Continued)

FOREIGN PATENT DOCUMENTS

AU 1005066 A * 2/1968 ............. B60R 13/04
CN 201724408 U 1/2011
(Continued)

OTHER PUBLICATIONS

Machine translation (Google patents) of CN 203381568 U. Translated Aug. 1, 2019. (Year: 2019).*
(Continued)

*Primary Examiner* — Frank J Vineis
*Assistant Examiner* — Ethan A. Utt
(74) *Attorney, Agent, or Firm* — Henry M. Feiereisen LLC

(57) ABSTRACT

In a method for connecting an attachment part to a structural part of a bodywork, a wall of the structural part is formed to at least partly encircle a region of the structural part. A form element is arranged to a main body of the attachment part. The attachment part is placed in the region of the structural part such that the form element touches the wall of the structural part, and the attachment part is pushed into the region, thereby causing the form element to move in relation to the main body of the attachment part until reaching an aperture in the wall of the structural part so that the form element moves into the aperture and is arranged therein to thereby position the attachment part in the region of the structural part.

15 Claims, 1 Drawing Sheet

(51) Int. Cl.
*B62D 27/00* (2006.01)
*B29C 65/48* (2006.01)
*F16B 11/00* (2006.01)
*B29K 705/00* (2006.01)
*B29L 31/30* (2006.01)

(52) U.S. Cl.
CPC ............ *F16B 11/006* (2013.01); *B29C 65/48* (2013.01); *B29K 2705/00* (2013.01); *B29L 2031/3002* (2013.01)

(58) Field of Classification Search
CPC ........ F16B 11/002; F16B 11/006; F16B 5/12; F16B 5/126; F16B 5/00; F16B 5/06; F16B 5/0607; F16B 5/0621; F16B 5/0664; B29C 65/58; B29C 65/56; E04C 2/38; E04C 2/384; E04C 2/388; Y10T 428/24008; Y10T 428/24017; Y10T 428/2419; Y10T 428/24198; Y10T 428/24215; Y10T 428/24231; Y10T 428/24264; B32B 3/00; B32B 3/02; B32B 3/06; B32B 3/08; B32B 3/26; B32B 3/30; B32B 1/00; B32B 1/04; B32B 1/06
USPC .............. 52/718.02, 718.03, 718.04, 718.05, 52/718.06, 716.5, 716.7, 730.1, 731.1, 52/731.6, 731.3, 731.2, 736.3, 736.4; 403/363, 375; 428/99, 100, 121, 122, 428/124, 126, 130
See application file for complete search history.

(56) References Cited

U.S. PATENT DOCUMENTS

| | | | |
|---|---|---|---|
| 5,572,843 A * | 11/1996 | Jordan | .................... E04D 5/142 52/718.04 |
| 5,676,510 A | 10/1997 | Fischer | |
| 6,062,602 A | 5/2000 | Biesinger | |
| 6,421,979 B1 * | 7/2002 | Fischer | .................... B29C 65/56 403/363 |
| 6,592,174 B1 * | 7/2003 | Rollin | .................. B62D 29/001 296/100.16 |
| 2003/0072905 A1 * | 4/2003 | Nakamura | .............. B29C 65/56 428/36.9 |
| 2007/0277926 A1 | 12/2007 | Naughton | |
| 2011/0037292 A1 * | 2/2011 | Owen | .................... B62D 27/04 296/193.09 |
| 2011/0265861 A1 * | 11/2011 | Nabauer | .................. E04C 3/07 136/251 |

FOREIGN PATENT DOCUMENTS

| | | | |
|---|---|---|---|
| CN | 202660489 U | | 1/2013 |
| CN | 203381568 U | * | 1/2014 |
| DE | 35 17 121 A1 | | 7/1986 |
| DE | 42 40 822 C1 | | 4/1992 |
| DE | 42 40 823 C1 | | 4/1992 |
| DE | 69513932 T2 | | 10/1995 |
| DE | 195 12 102 A1 | | 10/1996 |
| DE | 197 03 520 C1 | | 1/1997 |
| DE | 102004038901 B3 | | 3/2006 |
| FR | 2293621 A1 | | 8/1976 |
| GB | 2199213 A | * | 6/1988 ............. B29C 65/58 |
| SE | 8603258D0 | | 7/1986 |

OTHER PUBLICATIONS

Chinese Search Report dated Oct. 8, 2018 with respect to counterpart Chinese patent application 201710183441.3.1.
English translation of Chinese Search Report dated Oct. 8, 2018 with respect to counterpart Chinese patent application 201710183441.3.1.
Chinese Search Report dated Aug. 15, 2019 with respect to counterpart Chinese patent application 2017101834413.
Translation of Chinese Search Report dated Aug. 15, 2019 with respect to counterpart Chinese patent application 2017101834413.

* cited by examiner

METHOD OF CONNECTING AT LEAST TWO STRUCTURAL PARTS

CROSS-REFERENCES TO RELATED APPLICATIONS

This application claims the priority of German Patent Application, Serial No. 10 2016 003 810.1, filed Mar. 26, 2016, pursuant to 35 U.S.C. 119(a)-(d), the disclosure of which is incorporated herein by reference in its entirety as if fully set forth herein.

BACKGROUND OF THE INVENTION

The present invention relates to a method of connecting at least two structural parts, and to a bodywork.

The following discussion of related art is provided to assist the reader in understanding the advantages of the invention, and is not to be construed as an admission that this related art is prior art to this invention.

When manufacturing a bodywork of a motor vehicle, different structural parts are normally joined together. Problems oftentimes are encountered to compensate possible tolerances of the structural parts and tolerances resulting from connecting the structural parts. In addition, forces are encountered between the structural parts in opposition to the joining force by which the structural parts are connected to one another.

It would be desirable and advantageous to address these problem and to obviate other prior art shortcomings.

SUMMARY OF THE INVENTION

According to one aspect of the present invention, a method includes forming a wall of a first structural part such as to at least party encircle a region of the first structural part, arranging a form element to a main body of a second structural part, placing the second structural part in the region of the first structural part such that the form element touches the wall of the first structural part, and pushing the second structural part into the region, thereby causing the form element to move in relation to the main body of the second structural part until reaching an aperture in the wall of the first structural part so that the form element moves into the aperture and is arranged therein to thereby position the second structural part in the region of the first structural part.

In accordance with the present invention, the form element of the second structural part is moved inwardly in relation to the main body, i.e. deflected inwards or pressed inwards or bent inwards, when the second structural part is pushed into the region, and is moved outwardly into the aperture, i.e. deflected outwards or pressed outwards or bent outwards, when reaching the aperture, so that the form element locks or snaps into the aperture.

The first structural part can be a component of a bodywork and the second structural part can be an attachment part. The region is enclosed by the first structural part which is a component of a bodywork that can have plural such structural parts. The region can be bounded by at least one wall or also several walls that also form components of a bodywork. It is also possible that several walls are configured as components of only one structural part.

According to another advantageous feature of the present invention, an adhesive can be applied to at least one of the first and second structural parts at a spot that touches a contact zone of the other one of the first and second structural parts, when the second structural part is positioned in the region of the first structural part, thereby bonding the first and second structural parts to one another at the contact zone.

Adhesive can thus be applied at least at one spot of the main body of the attachment part. As an alternative or in addition, adhesive can be applied on the wall of the bodywork structural part. The contact zone touches the wall of the bodywork structural part and/or the attachment part as soon as the attachment part is positioned in the region, with the main body and the wall being bonded together at the contact zone.

Examples of an adhesive include single-component adhesive or multicomponent adhesive. The adhesive can be formed as adhesive tape, or pressed and/or powdery adhesive pre-coat and/or hot melt.

According to another advantageous feature of the present invention, the first structural part can be arranged in a first handling device, and the second structural part can be pushed or forced by a second handling device into the region.

According to another advantageous feature of the present invention, the second structural part can be moved by the second handling device in a first direction, when being pushed into the region, and the form element can be moved in a second direction and thereby turned in relation to the first direction by an angle which is greater than 0° and less than 180°, e.g. 90°.

According to another advantageous feature of the present invention, the form element can be deformed elastically, at least in part or at least in one section, when moving relative to the main body of the second structural part. The form element thus has at least one elastically and/or plastically deformable portion. Hence, the shaped part may also have at least one rigid portion.

According to another advantageous feature of the present invention, the form element can be connected to the main body of the second structural part by a connection element which is deformed when the form element is moved relative to the main body of the second structural part. The connection element may be configured as film hinge, via which the form element can be connected to the main body as a deformation and/or folding element. A film hinge can be a thinned-out portion of the main body and/or of the form element, which thinned-out portion can be elastically or plastically deformed and, for example, connect the main body to the form element.

Before the attachment part is pushed by the second handling device into the region of the bodywork structural part, the form element, which may be secured to the main body via the optional connection element, is folded outwards or bent outwards or deflected outwards. When placing the attachment part into the region, provision is normally made for the form element to initially bear upon a rim which is bounded by the wall and then to touch the wall, as the attachment part is pushed or moved into the region, so that the form element or the connection element as a result of its elastic deformation is moved inwards. The attachment part has hereby an outer dimension which, before being pushed into the region is greater than its inner dimension, is now reduced. As soon as the form element reaches the aperture, its spring-elastic configuration or a spring-elastic action of the connection element causes the form element to move outwards, so that the form element engages in the aperture of the wall to thereby formfittingly connect the attachment part and the bodywork structural part with one another.

The bodywork structural part and the attachment part, e.g. the main body and/or the form element, can be connected as soon as the attachment part is positioned in the region, by a joining process, normally bonding, with one another and in addition by another connection process such as spot welding, resistance spot welding, bolting, or riveting.

According to another aspect of the present invention, a bodywork includes a first structural part having a wall to at least partly encircle a region, the wall having an aperture, and a second structural part having a main body and a form element arranged on the main body, said form element being configured to be movable in relation to the main body between a folded-out position and a folded-in position, said second structural part being arranged in the region of the first structural part such that the form element assumes the folded-in position so as to touch the wall and to enter the aperture in the wall, thereby positioning and securing the second structural part in the region of the first structural part.

According to another advantageous feature of the present invention, the main body of the second structural part can have a maximum outer dimension which is smaller than a minimum inner dimension of the region, when the form element assumes the folded-in position, with the second structural part having a maximum outer dimension which is greater than the minimum inner dimension of the region, when the form element assumes the folded-out position.

According to another advantageous feature of the present invention, a spring-elastic and/or elastically deformable connection element, e.g. film hinge, can be provided to connect the main body and the form element of the second structural part with one another. As an alternative or in addition, the form element can have at least one section which is elastically deformable.

According to another advantageous feature of the present invention, an adhesive can be applied to bond the main body of the second structural part and the wall of the first structural part to one another at least at one spot. As an alternative or in addition, the attachment part and the wall can be connected to one another by a joining process such as riveting or resistance spot welding.

According to another advantageous feature of the present invention, at least one of the first structural part and the second structural part can be made, at least in part, of metal or of plastic, or by a combination thereof. In other words, at least one of the first and second structural parts can be made completely of metal, or completely of plastic, or of both metal and plastic. The form element may be configured as sheet-metal form element. The connection element is normally made of a same material as the attachment part.

When executing the method according to the present invention, the structural parts are connected or joined to one another and additionally bonded, with the structural parts being positioned as joining partners relative to one another tolerance-independent and with little springback. The form element is made during a forming process and/or shaping process, e.g. primary forming process or transforming process, when the attachment part as structural part is produced, and deforms later to realize a form fit between the attachment part and the bodywork structural part, when engaging the aperture in the wall of the bodywork structural part.

The second handling device to maneuver the attachment part into the region as encircled by the wall of the bodywork structural part can be configured as a robot. The attachment part is inserted into the region in a joining direction, with the second handling device applying a force in opposition to the joining direction. As soon as the form element, that has been formed onto the main body of the attachment part beforehand and moves along the wall, slides into the aperture of the wall, the entire attachment part is drawn into an intended position in view of the movement of the form element. Due to the configuration of the form element, at least one of the structural parts, normally the attachment part, is not exposed to an otherwise typical springback effect.

As a result, a force is exerted upon the second handling device in the joining direction, so that the attachment part, as soon as the form element is arranged in the aperture, spontaneously assumes its position in the region of the bodywork structural part, thus allowing the second handling device to be removed.

The application of adhesive enables a bond between the structural parts, even when the structural parts are made of different materials. In addition, the presence of an adhesive bond promotes a lightweight construction for a bodywork of a motor vehicle. The individual structural parts to be joined by adhesive normally represent components or subassemblies of an existing bodywork structure. Despite potentially existing dimensional deviations or tolerance deviations of both the attachment part and the bodywork structural part, the method according to the present invention still does not require the handling device to apply high forces in order to press the attachment part into the region of the bodywork structural part because of the movement that the form element is able to execute in relation to the main body of the attachment part and to assist the movement of the attachment part in relation to the bodywork structural part, when being deflected outwards into the aperture of the bodywork structural part. Subsequently, it is possible to secure the attachment part by a further joining process, e.g. resistance spot welding, to the bodywork structural part.

As a result, a meandering formation at an adhesive bond between the structural parts can be prevented, because of the absence of springback effects. The bodywork being manufactured by a method according to the present invention exhibits high vehicle stiffness and crash security. In addition, the bodywork exhibits high tightness. A method according to the present invention is also applicable, when one of the structural parts is difficult to access.

The quality of the provided adhesive bond is also enhanced by bridging any tolerance with little springback effect. Also process reliability is increased. As the structural parts move relative to one another, the form element snaps into the aperture in the wall of the bodywork structural part. Thus, it is possible to prevent separation of adhesive and to reduce meander formation of adhesive between the structural parts.

In the field of bodywork construction, bonding is normally used as a secondary joining process. Bonding may also be combined with a further joining process, e.g. resistance spot welding. Welds formed during resistance spot welding can hereby absorb loads between the structural parts, until the adhesive has fully set and/or hardened. As the form element of the attachment part enters the aperture of the bodywork structural part, any forces between the structural parts are compensated without impairing hardening and/or setting of the adhesive. A method according to the present invention can also be carried out for structural parts of different materials. It is only required to snap the attachment part into the bodywork structural part.

BRIEF DESCRIPTION OF THE DRAWING

Other features and advantages of the present invention will be more readily apparent upon reading the following description of currently preferred exemplified embodiments of the invention with reference to the accompanying drawing, in which.

DETAILED DESCRIPTION OF PREFERRED EMBODIMENTS

Figure 1:
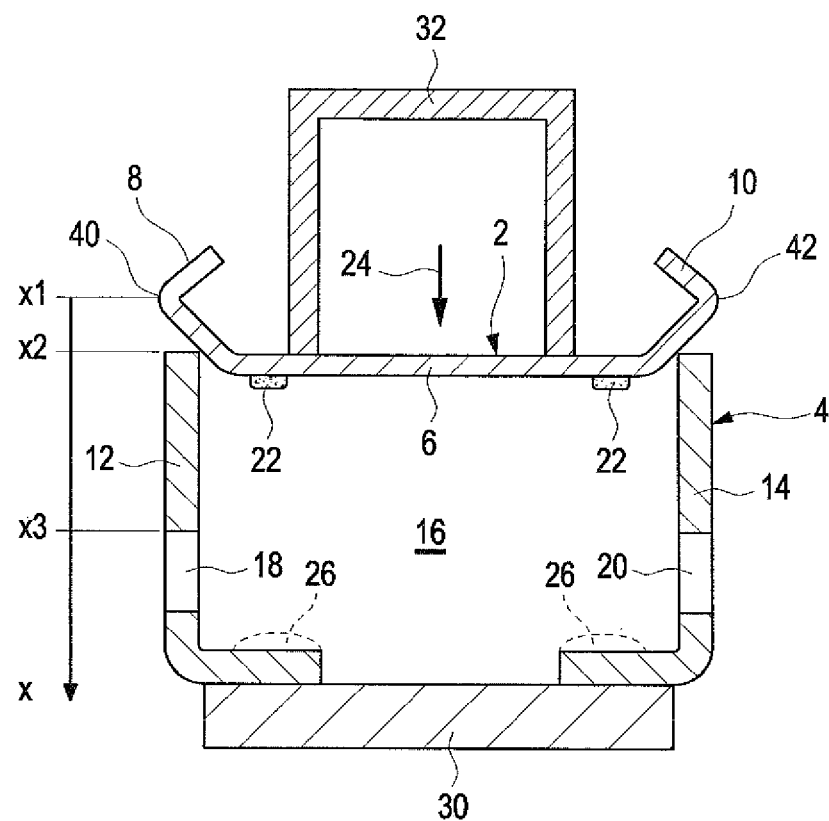
FIG. 1 is a schematic illustration of two structural parts to be joined by a method according to the present invention.

Throughout all the figures, same or corresponding elements may generally be indicated by same reference numerals. These depicted embodiments are to be understood as illustrative of the invention and not as limiting in any way. It should also be understood that the figures are not necessarily to scale and that the embodiments may be illustrated by graphic symbols, phantom lines, diagrammatic representations and fragmentary views. In certain instances, details which are not necessary for an understanding of the present invention or which render other details difficult to perceive may have been omitted.

Turning now to the drawing, and in particular to FIG. 1, there is shown a schematic illustration of two structural parts to be joined by a method according to the present invention. One of the structural parts represents, by way of example, an attachment part 2 and the other one of the structural parts represents, by way of example, a bodywork structural part 4. The attachment part 2 includes a main body 6 having a periphery to which a first form element 8 is attached and bent at an angle, and to which a second form element 10 is attached and bent at an angle. Both these form elements 8, 10 are produced through a shaping process. The form element 8 has a bend 40 and the form element 10 has a bend 42, with the bends 40, 42 extending at an angle which is greater than 0° and less than 180°, e.g. 90°. The bodywork structural part 4 has a first wall 12 and a second wall 14 to encircle a region 16 in which the attachment part 2 is to be arranged.

Normally, the region 16 is encircled and/or bounded by at least one bodywork structural part 4, i.e. one or more bodywork structural parts 4. It is hereby possible for example to form the first wall 12 as component of a first bodywork structural part 4 and the second wall 14 as component of a second bodywork structural part 4.

The first and second walls 12, 14 have apertures 18, 20, respectively. Provision is further made for adhesive 22 to be applied at two spots of the main body 6 of the attachment part 2. The bodywork structural part 4 is arranged and secured on or in a first handling device 30, whereas the attachment part 2 is connected to a second handling device 32 that moves the attachment part 2 in relation to the bodywork structural part 4.

Figure 2:
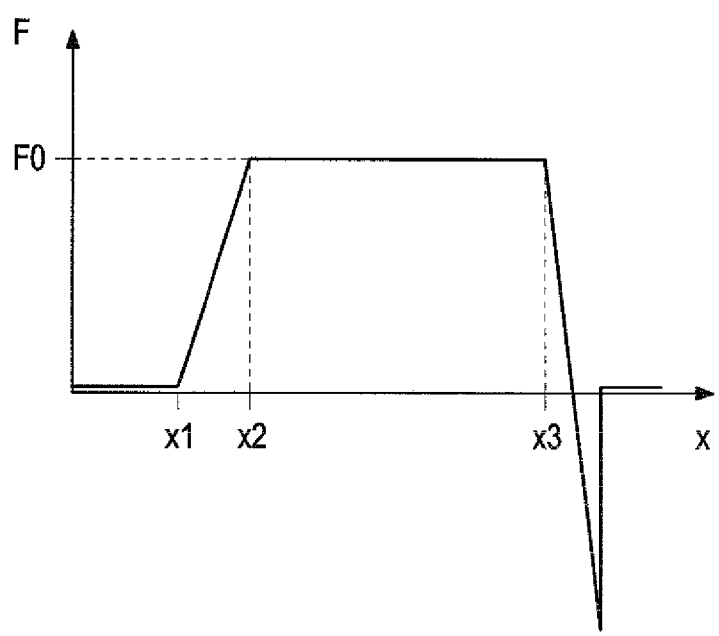
FIG. 2 is a graphical representation showing a course of a possible force generated by the method according to the present invention, with an abscissa representing the time x, and an ordinate representing the force F.

FIG. 1 further shows the presence of an x axis to indicate a position of the attachment part 2, i.e. of the bends 40, 42 and/or the main body 6, in relation to the region 16. This x axis represents also the abscissa of the graphical representation in FIG. 2. The ordinate of the graphical representation in FIG. 2 represents the F axis to indicate a course of a force F as a function of the position x or a form element 8, 10, here the bend 40, 42 of the corresponding form elements 8, 10, in relation to the bodywork structural part 4. The force F acts hereby upon the second handling device 32.

When producing a bodywork from the attachment part 2 and the bodywork structural part 4, the attachment part 2 is moved in a joining direction, indicated in FIG. 1 by arrow 24, in the direction of the region 16. The attachment part 2 and the bodywork structural part 4 touch each other for the first time, when the attachment part 2 has reached position x1. In the non-limiting example shown here, the bends 40, 42 of the form elements 8, 10 of the attachment part 2 touch the periphery of the walls 12, 14 of the bodywork structural part 4. The form elements 8, 10 are hereby deflected inwards in relation to the main body 6. In the further course, a force is applied upon the second handling device 32 in opposition to the joining direction, which is defined in the graphical representation of FIG. 2 as positive. As soon as the attachment part 2, i.e. bends 40, 42, has/have reached position x2, the form elements 8, 10 are further deflected inwards until the attachment part 2 can slide into the region 16 between the walls 12, 14 without undergoing any further deformation. A constant force F0 is hereby applied upon the second handling device 32 in opposition to the joining direction. As soon as the form elements 8, 10, i.e. bends 40, 42, have reached position x3, the form elements 8, 10 are deflected into the apertures 18, 20 in the walls 12, 14, respectively.

As shown in FIG. 2, the force exerted upon the second handling device 32 abruptly decreases and the form elements 8, 10 slide into the apertures 18, 20. As a result, a force acting on the second handling device 32 is directed in the direction of the joining direction. As the form elements 8, 10 snap into the apertures 18, 20 of the walls 12, 14, the attachment part 2 and the bodywork structural part 4 are connected to one another by a form fit, with the form elements 8, 10 pushing the attachment part 2 into the bodywork structural part 4. As a result, the second handling device 32 can be removed because of the absence of any springback effect between the attachment part 2 and the bodywork structural part 4.

Moreover, both sides of the main body 6, to which adhesive 22 has been applied, bear upon two contact zones 26 of the walls 12, 14, with the walls 12, 14 forming a bottom of the region 16 in the area of the contact zones 26. As the attachment part 2 and the bodywork structural part 4 are now connected with one another by an interference fit, the adhesive 22 at the contact zones 26 between the main body 6 and the walls 12, 14 is able to harden as a result of the fixation of the attachment part 2 with the bodywork structural part 4. Furthermore, it is possible to subject a bodywork, comprised of the attachment part 2 and the bodywork structural part 4, to further manufacturing steps, while the adhesive 22 hardens.

While the invention has been illustrated and described in connection with currently preferred embodiments shown and described in detail, it is not intended to be limited to the details shown since various modifications and structural changes may be made without departing in any way from the spirit and scope of the present invention. The embodiments were chosen and described in order to explain the principles of the invention and practical application to thereby enable a person skilled in the art to best utilize the invention and various embodiments with various modifications as are suited to the particular use contemplated.

What is claimed as new and desired to be protected by Letters Patent is set forth in the appended claims and includes equivalents of the elements recited therein:

What is claimed is:

1. A bodywork, comprising:
    a first structural part having two walls spaced from one another in a first direction and extending in a second joining direction which is transverse to said first direction to at least partly encircle a region, each of said walls having an aperture; and a second structural part having a main body extending in the first direction and having two opposite ends spaced from one another in the first direction, and two form elements arranged on the main body and located at said opposite ends correspondingly, said form elements being configured to be movable in relation to each other and to the main body between a folded-out position and a folded-in position, each of the form elements having a V-shaped bend with an apex and with a first inclined portion extending from one of the opposite ends of the main body of the second structural part laterally outwardly and upwardly to the apex and a second inclined portion extending from the apex laterally inwardly and upwardly, said second structural part being arranged in the region of the first structural part such that when the second structural part is moving into the first structural part in the second joining direction which is transverse to the first direction the form elements are deflected inwards in relation to the main body and assume the folded-in position so as first to touch the walls of the first structural part and then to enter the apertures in the walls, thereby positioning and securing the second structural part in the region of the first structural part.

2. The bodywork of claim 1, wherein the main body of the second structural part has a maximum outer dimension which is smaller than a minimum inner dimension of the region, when the form elements assume the folded-in position, said second structural part having a maximum outer dimension which is greater than the minimum inner dimension of the region, when the form element assumes the folded-out position.

3. The bodywork of claim 1, wherein the portions of the form elements are elastically deformable.

4. The bodywork of claim 1, further comprising spring-elastic connection elements configured to connect the main body and the form elements of the second structural part with one another.

5. The bodywork of claim 1, further comprising an adhesive to bond the main body of the second structural part and the walls of the first structural part to one another at least at one spot.

6. The bodywork of claim 1, wherein at least one of the first structural part and the second structural part is made, at least in part, of metal.

7. The bodywork of claim 1, wherein at least one of the first structural part and the second structural part is made, at least in part, of plastic.

8. A method, comprising:
forming two walls of a first structural part which are spaced from one another in p first direction and extend in a second joining direction which is transverse to the first direction such as to at least partly encircle a region of the first structural part, with each of the walls having an aperture;

attaching form elements to a main body of a second structural part, so that the main body extends in the first direction and has two opposite ends spaced from each other in the first direction, and the form elements are located at the opposite ends correspondingly and movable in relation to each other and to the main body between a folded-out and a folded-in position;

forming each of the form elements with a V-shaped bend having an apex, a first inclined portion extending from one of the opposite ends of the main body of the second structural part laterally outwardly and upwardly to the apex, and a second inclined portion extending from the apex laterally inwardly and upwardly;

placing the second structural part in the region of the first structural part such that the form elements touch the walls of the first structural part; and pushing the second structural part in the second joining direction into the region, thereby causing the form elements to move in relation to the main body of the second structural part to assume a folded-in position until reaching apertures in the walls of the first structural part so that upon reaching the apertures the form elements assume a folded-out position and move into the apertures and to be arranged therein to thereby position the second structural part in the region of the first structural part.

9. The method of claim 8, wherein the first structural part is a component of a bodywork and the second structural part is an attachment part.

10. The method of claim 8, further comprising applying adhesive to at least one of the first structural part and the second structural part at a spot that touches a contact zone of the other one of the first and second structural parts, when the second structural part is positioned in the region of the first structural part, thereby bonding the first and second structural parts to one another at the contact zone.

11. The method of claim 8, further comprising arranging the first structural part in a first handling device, and pushing the second structural part by a second handling device into the region.

12. The method of claim 8, wherein the second structural part is moved in the second joining direction, when being pushed into the region, and the form elements are moved in the first direction and thereby turned in relation to the second direction by an angle which is greater than 0° and less than 180°.

13. The method of claim 12, wherein the angle is 90°.

14. The method of claim 8, wherein the form elements are deformed elastically at least in part when the form elements are moved relative to the main body of the second structural part.

15. The method of claim 8, wherein each of the form elements is connected to the main body of the second structural part by a connection element which is deformed when the form elements are moved relative to the main body of the second structural part.

* * * * *

UNITED STATES PATENT AND TRADEMARK OFFICE
CERTIFICATE OF CORRECTION

PATENT NO. : 10,500,795 B2
APPLICATION NO. : 15/468483
DATED : December 10, 2019
INVENTOR(S) : Carsten Bär and Peter Wurster It is certified that error appears in the above-identified patent and that said Letters Patent is hereby corrected as shown below:

In the Claims

In Column 7, Claim 8, Line 53:
Replace "in p first" with --in a first--

Signed and Sealed this
Eighteenth Day of February, 2020

Andrei Iancu
*Director of the United States Patent and Trademark Office*